Nov. 28, 1939.　　　　R. LILLICH　　　　2,181,193
WELL RIG TRANSMISSION SYSTEM
Filed July 9, 1937

Inventor
RALPH LILLICH
Jesse R. Stone
Lester D. Clark
By
Attorneys

Patented Nov. 28, 1939

2,181,193

UNITED STATES PATENT OFFICE 2,181,193

WELL RIG TRANSMISSION SYSTEM

Ralph Lillich, Houston, Tex.

Application July 9, 1937, Serial No. 152,708

5 Claims. (Cl. 74—328)

This invention relates to a well rig transmission system and more particularly to such a system having a novel multi-speed transmission as an important adjunct to effective drilling by means of the rotary method.

It is an object of the invention to provide a device of the character described which is especially adapted for use in rotary well drilling equipment.

Another object is to provide a device of the class described so constructed to provide a plurality of speeds which may be changed from one to the other while under full load and speed.

Still another object is to provide a device of the class described which eliminates shock or jerk incident to speed changes.

A further object is to provide a multi-speed well rig transmission system which is compact and inexpensive and which will stand up under the severe stresses to which the equipment is subjected in the field to which the invention relates.

Another object is to provide a transmission system of a novel type in which the plurality of speeds necessary for expeditious drilling operations may be effectively obtained through novel utilization of the combination of a planetary transmission and a multiple disc friction clutch.

In accordance with the present invention a transmission system is provided which is compact and which may be readily controlled to cooperate with other equipment to form a complete drilling unit. Furthermore, the change speed mechanism forming a part of the invention is so constructed that speed changes in either forward or reverse direction may be effected without the shifting of gears or the engagement of jaw clutches.

The many advantages of the invention, including the foregoing, will be apparent to those skilled in the art by reference to the following description of the preferred form of a well rig transmission system embodying the invention and illustrated in the accompanying drawing, in which.

Figure 3:
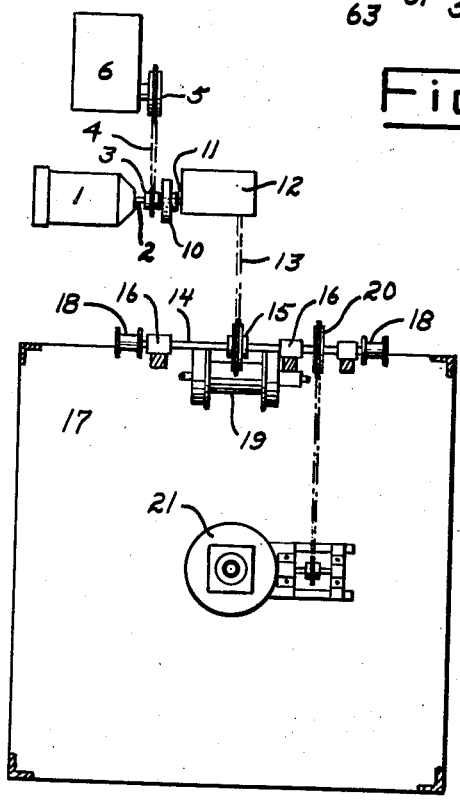
Fig. 3 is a plan view of the arrangement of parts of a rotary well rig embodying the invention.

A rotary drill rig comprising the present invention is shown in Fig. 3 as comprising prime mover 1 such as a steam engine or an internal combustion motor having a drive shaft 2 which is suitably connected through a sprocket 3 and chain 4 to a sprocket 5 on the slush pump 6. Also mounted on shaft 2 is a clutch 10 through which a driving connection is made with an input shaft 11, which extends into transmission housing 12 to drive through an enclosed mechanism, particularly illustrated in Figs. 1 and 2, a chain 13 which drives line shaft 14 through sprocket 15 affixed thereto. Line shaft 14 is rotatably mounted in bearings 16 adjacent the edge of the derrick platform 17 and carries catheads 18, which are provided for purposes well known in the art. A mechanism, not shown, is also provided for effecting a driving connection between shaft 14 and hoisting drum 19. A drive chain extends from sprocket 20, affixed to line shaft 14, to the rotary table 21, located centrally of the derrick platform.

Figure 1:
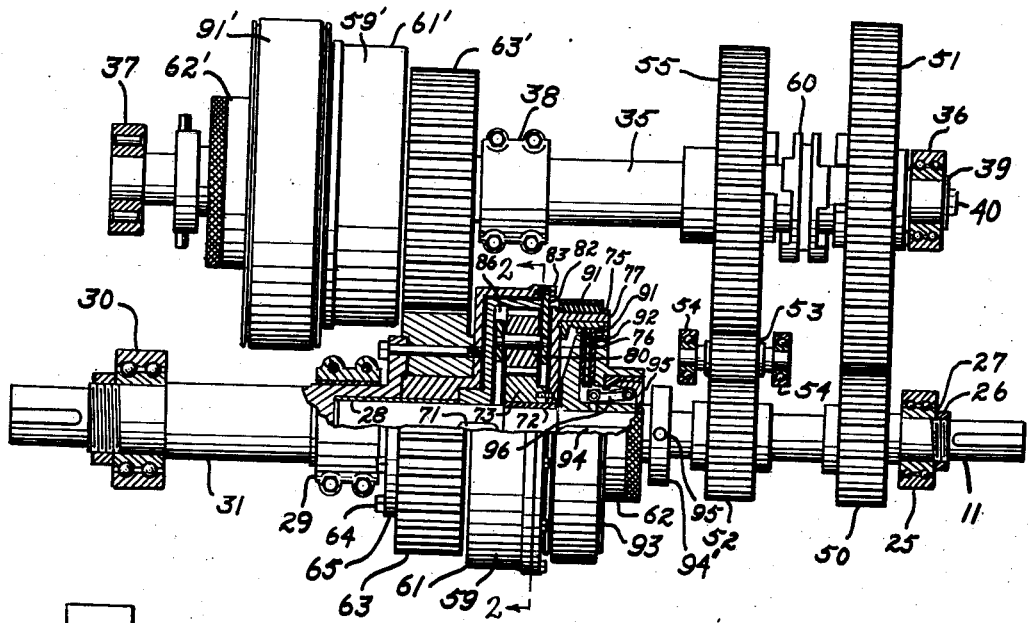
Fig. 1 is a view partly in section of a multi-speed transmission comprising an element of the invention.

Referring now to Fig. 1, the mechanism enclosed within housing 12 in Fig. 3 for transmitting energy from drive shaft 11 to drive chain 13 is shown as comprising the input shaft 11 provided with an anti-friction bearing 25, which serves as a journal for the shaft and also prevents end-wise movement thereof by virtue of a threaded nut 26 screwed upon the shaft 11 which holds the inner-race 27 in fixed position upon the shaft 11. The opposite end of shaft 11 is journaled in a bearing 28 within the end of the output shaft 31, which is in turn journaled in bearings 29 and 30, the latter of which is fixed upon the shaft 31 in a manner above described relative to bearing 25. It is thus apparent that shafts 11 and 31 are coaxial and are mounted in a manner to be restrained from axial movement.

A countershaft 35 is rotatably mounted in end bearings 36 and 37 and an intermediate bearing 38, end bearing 36 having its inner-race fixed to the shaft 35 through a washer 39 and a cap screw 40 fixed to the end of the shaft. The countershaft 35 is thus restrained from axial displacement.

The pinion 50 fixed to the input shaft 11 meshes with a gear 51 which is rotatably mounted upon the shaft 35. Similarly, the pinion 52 fixed to the input shaft 11 meshes with an intermediate gear 53 mounted in the bearings 54. The intermediate gear 53 meshes in turn with the gear 55, also rotatably mounted upon the countershaft 35. It is thus apparent that gears 51 and 55 will rotate in opposite directions when driven by the rotation of input shaft 11. Splined upon the countershaft 35 between gears 51 and 55 is a shiftable clutch collar 60 having jaws on its opposite faces adapted to engage with complementary jaws on the inner faces of gears 51, 55. Suitable means, not shown, is provided for retaining clutch collar 60 intermediate the gears 51 and 55, or for shifting the clutch collar 60 into engagement with either of these gears whereby the countershaft 35 will be driven in either a clockwise or counter-clockwise direction.

Mounted upon the input shaft 11 and upon countershaft 35 are epicyclic gear trains generally designated as 61 and 61' and friction clutches 62 and 62'.

As these assemblies are similar in construction, the assembly on the countershaft being more heavily constructed in order to withstand greater torque, a description of one of these assemblies will suffice to describe and explain the operation of both. It will be here noted, however, that the carrier of the epicyclic train 61 is connected through the drum 59 and the gear wheel 63 by means of bolts 64 to a flange 65 on the output shaft 31 whereby rotation of the drum 59 will drive the output shaft 31. The drum 59' of the epicyclic gear train 61' is secured to gear 63' which meshes with gear 63 whereby drive effort imparted to the carrier of the gear train 61' will be instrumental in driving the output shaft 31 through intermeshing gears 63' and 63.

Figure 2:
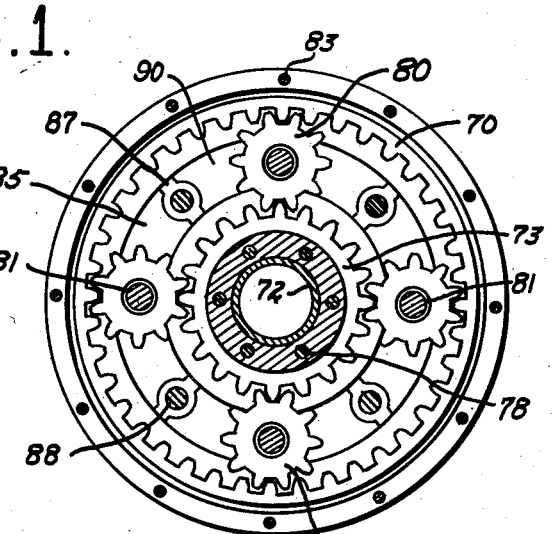
Fig. 2 is a sectional view taken on line 2—2 of Fig. 1 as viewed in the direction of the arrows.

Further description will be directed to the construction and operation of the assembly comprising epicyclic gear train 61 and its associated friction clutch 62, best shown in the sectional views of Figs. 1 and 2.

An internal gear 70 is affixed upon shaft 11 through a suitable key 71. Within the internal gear 70 and upon the shaft 11 is a bushing 72 about which a sun pinion 73 is mounted for rotation. A drum 75, comprising a web 76 and a flange 77, is secured to the sun pinion 73 as by cap screws 78. Intermediate the sun pinion 73 and the internal gear 70 are planetary gears 80 shown as four in number in Fig. 2.

These gears mesh diametrically with the sun pinion 73 and internal gear 70 and are rotatably mounted upon stub shafts 81 which have one end affixed to the radial flange 82, which is attached to drum 59 by studs 83. The opposite end of the stub shafts 81 are affixed to a ring casting 85 lying within the chamber 86 in the internal gear 70. The ring casting 85 is provided with bosses 87 intermediate the planetary gears 80 to receive bolts 88 for securing the flange 82, the stub shafts 81 and the ring casting 85 into a unitary structure which comprises the carrier of the epicyclic gear train and is generally designated as 90.

From the above description it is apparent that rotation of the shaft 11 will cause internal gear 70 to rotate. Assuming a load on the output shaft 31, the carrier 90 will remain stationary and the planetary gears 80 will rotate on their respective axes, while the sun pinion 73, and its associated drum 75, will likewise rotate upon its bearing 72. Surrounding flange 77 of the drum 75 is a brake band 91 and provided with actuating means (not shown) whereby rotation of the sun pinion may be restrained. Braking effort applied to the drum 75 will cause the carrier 90 to rotate and to drive the load on the shaft 31. When the rotation of the drum 75 is entirely arrested shaft 31 will be driven at a definite speed relative to that of the input shaft 11 and such speed will depend upon the relative dimensions of the respective pinions and gears forming the epicyclic gear train 61.

The inner peripheral surface of flange 77 on the drum 75 is provided with driving teeth 91 to engage complementary teeth on the friction plates 92 of the friction clutch 62. The driving plate 93 of the clutch is attached to shaft 11 by means of a key 94. A frictional drive between the driving plate 93 and the friction plates 92 is obtained by axial movement of the collar 94', which is provided with radial studs 95 adapted to receive the ends of the shifting yoke, not shown. Inward movement of the collar 94' causes telescopic movement of ring 95 relative to driving plate 93. Flange ring 95 has an inner cam surface which acts through a toggle mechanism 96 to cause the driving plate 93 to move inwardly and produce the necessary friction with the friction plates 92. In this manner the desired driving connection between the driving plate 93 and the friction plates 92 is obtained. It is thought apparent that when the clutch 62 is engaged sun pinion 73 is locked to the input shaft 11. Since the internal gear 70 is also fixed to the input shaft 11 there could be no relative movement of these parts in the epicyclic gear train 61 and there is, therefore, a direct drive from the input shaft 11 to the output shaft 31.

In the operation of the mechanism just described, in forward speeds collar 60 is shifted to engage with gear 51. If the input shaft 11 is then driven by the prime mover 1 and braking effort is applied to drum 75 of epicyclic gear train 59' through brake band 91', and its associated mechanism, the carrier of the epicyclic gear train 61' is rotated and drives output shaft 31 through gears 63' and 63 at a low driving ratio between the drive shaft 11 and the driven output shaft 31. If the brake 91' is released and clutch 62' is actuated a direct drive, as explained above, is effected between the countershaft 35 and the gear 63' whereby a higher driving ratio is obtained.

For the next higher speed, clutch 62' is disengaged and brake 91 is applied to the drum 77 whereby a driving connection takes place through the carrier 90 in its rotation about the sun pinion 73. The highest driving ratio is obtained as by releasing the brake 91 and engaging the clutch 62 to obtain a direct drive between the input shaft 11 and the output shaft 31. It is here to be noted that no shifting of gears is necessary in the progressive changes of speed ratios as just described. Obviously this feature eliminates the clashing of gears or of dental clutches incident to shifting of gears as is well known in the art. This is an important advantage of the present invention and it is believed obvious that the desired objective is obtained by the device just described.

If reverse speeds are desired, clutch collar 60 is shifted to engage with the gear wheel 55 to rotate the countershaft in the reverse direction to that above assumed. Two speeds in reverse are thus obtained in sequentially operating brake 91' and the clutch 62'. Here again the different speed ratios are obtained without the necessity of shifting gears.

Although the foregoing description of the preferred embodiment of the invention is directed to certain specific details of that embodiment, it is not contemplated that the invention shall be limited thereto but shall be construed as embracing such changes in form and construction as lie within the province of the skilled artisan and are embraced by the appended claims.

What is claimed is:

1. In a multiple speed well rig transmission system, a source of power, an input shaft operatively connected to said source of power, a countershaft parallel with said input shaft, a clutch collar slidably fixed on said countershaft, drive gears rotatively mounted on said countershaft on opposite sides of said clutch collar, said clutch collar being shiftable to engagement with either of said drive gears, gear connections between said drive gears and the input shaft for driving said drive gears in opposite directions, an epicyclic gear train on each of said shafts, each of said epicyclic gear trains having the internal gear thereof fixed to its shaft and the sun pinion thereof rotatively mounted upon its shaft, an output shaft, a driving connection between the carrier of each of said gear trains and the output shaft, separate braking means for restraining the sun pinion of the respective epicyclic gear trains from rotation, and separate means for each of said epicyclic gear trains for locking the sun pinion thereof to its shaft.

2. In a multiple speed well rig transmission system, a source of power, an input shaft operatively connected to said source of power, an output shaft, a countershaft parallel with said input shaft, an epicyclic gear train on each said input shaft and said countershaft, each of said gear trains having the internal gear thereof fixed to its shaft and the sun pinion thereof rotatively mounted upon its shaft, a driving connection between the carrier of each of said gear trains and said output shaft, separate braking means for restraining the sun pinion of the respective gear trains from rotation, and separate clutch means for each of said gear trains for locking the sun pinion thereof to its shaft.

3. In a multiple speed well rig transmission a drive shaft, a driven shaft coaxial with said drive shaft, a countershaft parallel with said shafts, means for driving said countershaft from said drive shaft, a sun pinion rotatably mounted on said countershaft, an internal gear surrounding said sun pinion and fixed to said countershaft, planetary pinions between the sun pinion and the internal gear, a spider rotatably supporting said planetary pinions, means connecting said spider to the output shaft whereby the output shaft may be driven thereby, friction means for restraining said sun pinion from rotation, and a friction clutch operatively connected to said countershaft and to said sun pinion whereby the spider may be locked in driving connection with the countershaft when said friction means is released.

4. In a multiple speed well rig transmission, a drive shaft, a driven shaft, a countershaft rotatively mounted in parallel relation with said first mentioned shaft, means for driving the countershaft from the input shaft, an epicyclic gear train mounted on said countershaft, said gear train having the internal gear thereof fixed to said countershaft and the sun pinion thereof rotatively mounted upon the countershaft, a driving connection between the carrier of said gear train and said driven shaft, braking means for restraining the sun pinion from rotation relative to said shaft, and a clutch operatively connected to said countershaft and the sun pinion for engagement when said braking means is released whereby the carrier may be driven at two speeds from a source of power connected to the input shaft.

5. In a multiple speed transmission system, a source of power, an input shaft operatively connected to the source of power, an output shaft, a countershaft parallel with said input shaft, an epicyclic gear train on each the input shaft and the countershaft, each of said gear trains having the internal gear thereof fixed to its shaft and the sun pinion thereof rotatably mounted upon the shaft, means interconnecting the carriers of the gear trains, and a connection between the last mentioned means and the output shaft.

RALPH LILLICH.